(12) United States Patent
Kim

(10) Patent No.: US 10,897,038 B2
(45) Date of Patent: Jan. 19, 2021

(54) POSITIVE ELECTRODE AND LITHIUM SECONDARY BATTERY INCLUDING THE SAME

(71) Applicant: LG Chem, Ltd., Seoul (KR)

(72) Inventor: Dae-Soo Kim, Daejeon (KR)

(73) Assignee: LG Chem, Ltd. (KR)

( * ) Notice: Subject to any disclaimer, the term of this patent is extended or adjusted under 35 U.S.C. 154(b) by 108 days.

(21) Appl. No.: 16/073,951

(22) PCT Filed: Feb. 6, 2017

(86) PCT No.: PCT/KR2017/001297
§ 371 (c)(1),
(2) Date: Jul. 30, 2018

(87) PCT Pub. No.: WO2017/135792
PCT Pub. Date: Aug. 10, 2017

(65) Prior Publication Data
US 2019/0044127 A1 Feb. 7, 2019

(30) Foreign Application Priority Data
Feb. 4, 2016 (KR) .................. 10-2016-0014297

(51) Int. Cl.
*H01M 4/131* (2010.01)
*H01M 4/505* (2010.01)
*H01M 4/525* (2010.01)
*H01M 4/62* (2006.01)
*H01M 4/66* (2006.01)
(Continued)

(52) U.S. Cl.
CPC .......... *H01M 4/131* (2013.01); *H01M 4/505* (2013.01); *H01M 4/525* (2013.01); *H01M 4/62* (2013.01); *H01M 4/622* (2013.01); *H01M 4/66* (2013.01); *H01M 10/0525* (2013.01);
(Continued)

(58) Field of Classification Search
CPC ...... H01M 4/131; H01M 4/505; H01M 4/525; H01M 4/62; H01M 4/66; H01M 10/0525; H01M 10/42
See application file for complete search history.

(56) References Cited

U.S. PATENT DOCUMENTS

| 2014/0106218 A1 | 4/2014 | Lee et al. |
| 2014/0154572 A1 | 6/2014 | Singh et al. |
| 2015/0108410 A1* | 4/2015 | Zhang .................. H01M 4/622 252/500 |

FOREIGN PATENT DOCUMENTS

| KR | 20140046987 A | 4/2014 |
| KR | 20150050467 A | 5/2015 |

OTHER PUBLICATIONS

Sun, Minghao et al., "Ivenstigation of Carboxymethyl Chitosan as New Water Soluble Binder for LiFePO4 Cathode in Li-Ion Batteries", Electrochimica Acta, vol. 127, Received Dec. 10, 2013; Received in revised form Jan. 22, 2014; Accepted Feb. 6, 2014; Available Feb. 19, 2014, pp. 239-244. (Year: 2014).*
(Continued)

*Primary Examiner* — Karie O'Neill Apicella
(74) *Attorney, Agent, or Firm* — Lerner, David, Littenberg, Krumholz & Mentlik, LLP

(57) ABSTRACT

The present disclosure relates to a positive electrode which includes a lithium transition metal composite oxide and a binder polymer, wherein the binder polymer has a functional group capable of adsorbing the transition metal ions of the lithium transition metal composite oxide.

7 Claims, 1 Drawing Sheet

(51) Int. Cl.
    *H01M 10/42*     (2006.01)
    *H01M 10/0525*     (2010.01)
    *H01M 10/052*     (2010.01)
    *H01M 4/02*     (2006.01)

(52) U.S. Cl.
    CPC .......... *H01M 10/42* (2013.01); *H01M 10/052* (2013.01); *H01M 2004/028* (2013.01)

(56) References Cited

OTHER PUBLICATIONS

Search report from International Application No. PCT/KR2017/001297, dated May 24, 2017.

Sun, Minghao, et al., "Investigation on Carboxymethyl Chitosan as New Water Soluble Binder for LiFePO4 Cathode in Li-Ion Batteries." Electrochimica Acta, vol. 127, Received Dec. 10, 2013, Received in revised form Jan. 22, 2014; Accepted Feb. 6, 2014; available online Feb. 19, 2014, pp. 239-244.

Chai, et al., "Chitosan, a new and environmental benign electrode binder for use with graphite anode in lithium-ion batteries." Electrochimica Acta, vol. 105, Received Mar. 22, 2013; Received in revised form Apr. 30, 2013; Accepted May 6, 2013; Available online May 14, 2013, pp. 378-383.

* cited by examiner

POSITIVE ELECTRODE AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2017/001297, filed Feb. 6, 2017, which claims priority to Korean Patent Application No. 10-2016-0014297, filed Feb. 4, 2016, the disclosures of which are incorporated herein by reference.

TECHNICAL FIELD

The present disclosure relates to a positive electrode and a lithium secondary battery including the same. More particularly, the present disclosure relates to a positive electrode having improved high-temperature performance and a lithium secondary battery including the same.

BACKGROUND ART

Recently, energy storage technology has been given increasing attentions. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused.

Among the commercially available secondary batteries, lithium secondary batteries developed in the early 1990's mostly include oxides of metal ions, such as nickel, cobalt and manganese, as positive electrode active materials.

While the batteries repeat charge/discharge, there is a problem in that the metal ions are dissolved into an electrolyte to a concentration of several tens to several hundreds of ppm and the thus dissolved manganese ions are electrodeposited on a negative electrode through a separator, resulting in degradation of the performance of batteries undesirably. Such a problem becomes severe at a higher temperature of 50° C. or higher.

To solve the problem, there have been suggested a method for substituting manganese dissolved into an electrolyte with a more stable metal, a method for surface modification of manganese oxide, adding an additive forming a complex to an electrolyte, or the like. However, there is still a need for a solution capable of solving the problem of manganese ion transfer more fundamentally.

DISCLOSURE

Technical Problem

The present disclosure is designed to solve the problems of the related art, and therefore the present disclosure is directed to providing a positive electrode which can interrupt transfer of metal ions to a negative electrode, and a lithium secondary battery including the same.

Technical Solution

In one aspect of the present disclosure, the positive electrodes according to the following embodiments are provided.

According to a first embodiment of the present disclosure, there is provided a positive electrode which includes a lithium transition metal composite oxide and a binder polymer, wherein the binder polymer has a functional group capable of adsorbing the transition metal ions of the lithium transition metal composite oxide.

According to a second embodiment, there is provided the positive electrode of the first embodiment, wherein the binder polymer is formed by polymerization of single molecules containing the functional group capable of adsorbing the transition metal ions and a binder backbone.

According to a third embodiment, there is provided the positive electrode of the first or the second embodiment, wherein the functional group capable of adsorbing the transition metal ions may include at least one selected from the group consisting of a hydroxyl group, aldehyde group, carboxyl group, nitro group, carbonyl group, ether group, ester group, amine group, formyl group, phenol group, pyridine group and a phosphine group.

According to a fourth embodiment, there is provided the positive electrode of the first to the third embodiments, wherein the lithium transition metal composite oxide is at least one selected from the group consisting of lithium manganese oxide, lithium cobalt oxide, lithium nickel oxide, lithium nickel manganese oxide and lithium nickel manganese cobalt oxide.

According to a fifth embodiment, there is provided the positive electrode of the second embodiment, wherein the binder backbone may include at least one selected from the group consisting of polyvinylidene fluoride, polyvinylidene fluoride-co-hexafluoroproyplee (PVDF-co-HFP), polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, ethylene-prop ylene-diene terpolymer (EPDM), sulfonated EPDM, styrene butadiene rubber (SBR), fluororubber, polyacrylonitrile and polymethyl methacrylate.

According to a sixth embodiment, there is provided the positive electrode of the second embodiment, wherein the single molecules comprising the functional group capable of adsorbing the transition metal ions is present in an amount of 0.01-2 parts by weight based on 100 parts by weight of the binder backbone.

According to a seventh embodiment, there is provided the positive electrode of the first to the sixth embodiments, which may further include a positive electrode current collector coated with the lithium transition metal composite oxide and the binder polymer.

According to an eighth embodiment, there is provided the positive electrode of the seventh embodiment, wherein the positive electrode current collector may include at least one selected from the group consisting of stainless steel, aluminum, nickel, titanium and baked carbon.

In another aspect of the present disclosure, there is also provided a lithium secondary battery including a negative electrode, the positive electrode as defined in any one of the first to the eighth embodiments, a separator interposed between the negative electrode and the positive electrode, and a non-aqueous electrolyte.

Advantageous Effects

The positive electrode according to the present disclosure includes a binder polymer having a functional group capable of adsorbing transition metal ions derived from a lithium transition metal composite oxide, and thus can interrupt transfer of the transition metal ions to the negative electrode.

In addition, since the positive electrode according to the present disclosure can prevent the metal ions from being transferred to and deposited on the negative electrode in the form of metal, it is possible to improve the high-temperature performance of a battery and to provide a battery with reinforced stability.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The positive electrode according to an embodiment of the present disclosure includes a lithium transition metal composite oxide and a binder polymer, wherein the binder polymer has a functional group capable of adsorbing the transition metal ions of the lithium transition metal composite oxide.

Figure 1:
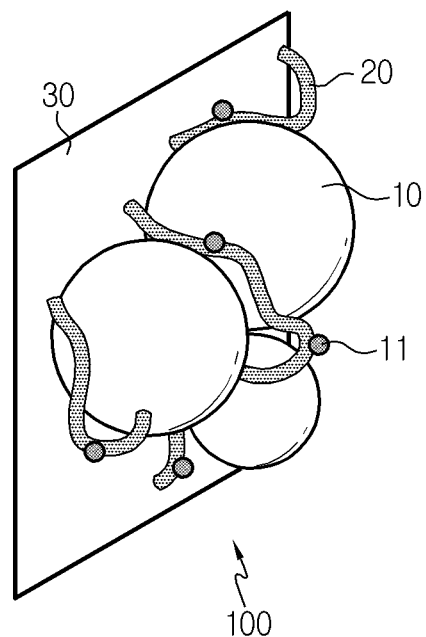
FIG. 1 is a schematic view illustrating the positive electrode according to an embodiment of the present disclosure.

FIG. 1 is a schematic view illustrating the positive electrode according to an embodiment of the present disclosure. Referring to FIG. 1, the positive electrode 100 according to a preferred embodiment of the present disclosure includes a lithium transition metal composite oxide 10 and a binder polymer 20 coated on a positive electrode current collector 30, and the transition metal ions 11 derived from the lithium transition metal composite oxide are adsorbed to the binder polymer 20.

The lithium transition metal composite oxide that may be applied to the present disclosure is not particularly limited, as long as it is a material capable of intercalation/deintercalation of lithium ions. Preferably, the lithium transition metal composite oxide may include at least one selected from lithium manganese oxides, lithium cobalt oxides, lithium nickel oxides, lithium nickel manganese oxides and lithium nickel manganese cobalt oxides, and particular examples thereof may include any one selected from $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0<y<1), $Li_xNi_{1-y}Mn_yO_2$ (0.5<x<1.3, 0<y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3) and $Li_xFePO_4$ (0.5<x<1.3), or a combination of two of more of them, but are not limited thereto.

In addition, the binder polymer that may be applied to the present disclosure functions to adsorb transition metal ions derived from the lithium transition metal composite oxide, while it assists the binding of the lithium transition metal composite oxide as a positive electrode active material with a conductive material, or the like, and the binding to the positive electrode current collector.

Figure 2:
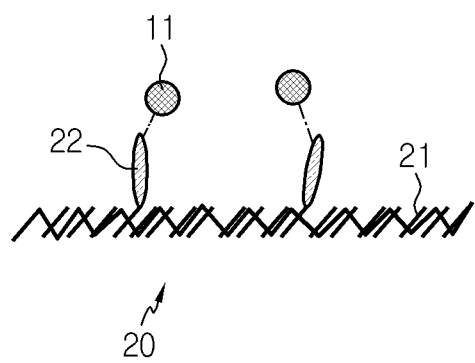
FIG. 2 is a schematic view illustrating the binder polymer contained in the positive electrode according to an embodiment of the present disclosure.

FIG. 2 is a schematic view illustrating the binder polymer contained in the positive electrode according to an embodiment of the present disclosure. Referring to FIG. 2, the binder polymer 20 contained in the positive electrode according to an embodiment of the present disclosure may include a binder backbone 21 to which a functional group 22 capable of adsorbing transition metal ions 11 is bound.

Herein, the binder backbone is not particularly limited, as long as it is a material that assists the binding to an electrode active material and electrode current collector. Non-limiting examples of the binder backbone may include at least one selected from the group consisting of polyvinylidene fluoride, polyvinylidene fluoride-co-hexafluoroproyplee (PVDF-co-HFP), polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene terpolymer (EPDM), sulfonated EPDM, styrene butadiene rubber (SBR), fluororubber, polyacrylonitrile and polymethyl methacrylate.

The functional group capable of adsorbing the transition meal ions is not particularly limited, as long as it is a material capable of adsorbing at least one of the transition metal ions, such as Cr, Mn, Ni, Co and Cu, derived from the lithium transition metal composite oxide. Non-limiting examples of the functional group, which is bound to the binder backbone, may include any one selected from the group consisting of a hydroxyl group, aldehyde group, carboxyl group, nitro group, carbonyl group, ether group, ester group, amine group, formyl group, phenol group, pyridine group and a phosphine group, or two or more of them.

Herein, the transition metal ions may be adsorbed in various manners depending on types of functional groups. Non-limiting examples of the adsorption manners include exchange adsorption based on ion exchange, contact adsorption based on ionic binding, or the like. It is possible to interrupt transfer of the transition metal ions to the negative electrode by virtue of the adsorption.

According to an embodiment of the present disclosure, the functional group capable of adsorbing transition metal ions may be bound to the binder backbone. According to an embodiment of the present disclosure, the functional group may be chitosan and/or may include chitosan. Particular examples of such a functional group may include $C_{56}H_{103}N_9O_{39}$, $Ca_6Al_2(SO_4)_3(OH)_{12} \cdot 26H_2O$, chitosan-CPL{$(NaKCa_{0.5})_{54}(Al_{5.4}Si_{30.6}O_{72}) \cdot 20H_2O$}, or polyvinyl acetate (chitosan-PVA) containing chitosan bound to the OH group thereof. Among them, $Ca_6Al_2(SO_4)_3(OH)_{12} \cdot 26H_2O$ is capable of adsorbing Cr and/or Mn ions, and $C_{56}H_{103}N_9O_{39}$ and chitosan-CPL are capable of adsorbing Ni and/or Co ions. In addition, chitosan-PVA is capable of adsorbing Cu ions.

The above-mentioned functional groups are bound covalently with metal ions to be adsorbed so that the metal ions may be immobilized. In this manner, it is possible to adsorb the transition metal ions in an electrolyte. For example, the functional group of the aforementioned compounds contains an amine ($NH_2$) group, and the amine ($NH_2$) group may be bound covalently with transition metal ions to immobilize the transition metal ions.

Introduction of such functional groups may be carried out in various manners depending on the types of binder backbones and functional groups. Non-limiting examples of the introduction manners include mixing single molecules containing a functional group capable of adsorbing transition metal ions in a binder backbone to obtain a binder polymer through polymerization.

Herein, the single molecules comprising the functional group capable of adsorbing transition metal ions may be present in an amount of 0.01-2 parts by weight, or 0.5-1 parts by weight based on 100 parts by weight of the binder backbone. When the content of the functional group satisfies the above-defined range, it is possible to adsorb transition metal ions efficiently, while maintaining the function as a binder.

The positive electrode according to an embodiment of the present disclosure may include a positive active material layer coated on either surface or both surfaces of a positive electrode current collector, and the positive active material layer includes a lithium transition metal composite oxide and a binder polymer.

Non-limiting examples of the positive electrode current collector include stainless steel, aluminum, nickel, titanium, baked carbon or copper; stainless steel surface-treated with carbon, nickel, titanium or silver; or the like.

If necessary, the positive electrode active material layer may further include a conductive material, dispersant, filler, or the like. There is no particular limitation in the conductive material, as long as it has conductivity while not causing any chemical change. Non-limiting examples of the conductive material include: graphite, such as natural graphite or artificial graphite; carbon black, such as carbon black, acetylene black, ketjen black, channel black, furnace black, lamp black or thermal black; conductive fibers, such as carbon fibers or metal fibers; metal powder, such as fluorocarbon, aluminum or nickel powder; conductive whiskers, such as zinc oxide or potassium titanate; conductive metal oxide, such as titanium oxide; conductive materials, such as polyphenylene derivatives; or the like. In general, such a conductive material may be added in an amount of 1-20 wt % based on the total weight of the mixture containing the mixed electrode active material.

The dispersant may include N-methyl-2-pyrrolidone, diacetone alcohol, dimethyl formaldehyde, propylene glycol monomethyl ether, methyl cellosolve, ethyl cellosolve, butyl cellosolve, isopropyl cellosolve, acetylacetone, methyl isobutyl ketone, n-butyl acetate, cellosolve acetate, toluene, xylene, or the like, alone or in combination.

In addition, the filler that may be used herein is not particularly limited, as long as it is a fibrous material causing no chemical change in the corresponding battery. Non-limiting examples of the filler include olefinic polymers, such as polyethylene and polypropylene; fibrous materials, such as glass fibers and carbon fibers; or the like.

In another aspect, there is provided a lithium secondary battery including the above-described positive electrode, a negative electrode, a separator interposed between the positive electrode and the negative electrode, and anon-aqueous electrolyte.

The negative electrode that may be used herein is not particularly limited and may be the conventional negative electrode. A non-limiting example of the negative electrode may include a negative electrode current collector and a negative electrode active material layer formed on one surface of the negative electrode current collector.

Non-limiting examples of the negative electrode current collector may be any one selected from the group consisting of copper; stainless steel; aluminum; titanium; baked carbon; copper; stainless steel surface-treated with carbon, nickel, titanium or silver; and aluminum-cadmium alloy, or a combination of two or more of them.

A non-limiting example of the negative electrode active material layer may include a negative electrode active material, a binder and a solvent, optionally in combination with a conductive material and a dispersant.

The separator that may be used herein is not particularly limited, as long as it is material and has a shape used for preventing a short-circuit between a positive electrode and a negative electrode in the art. A non-limiting example of the separator may include a porous substrate and a porous coating layer formed on either surface or both surfaces of the porous substrate and containing inorganic particles and a binder polymer.

Herein, the porous substrate may include a porous polymer film substrate or porous polymer nonwoven web substrate. For example, the porous polymer film substrate may be a porous polymer film including polyolefin, such as polyethylene or polypropylene. Such a polyolefin porous polymer film substrate may realize a shut-down function at a temperature of 80-130° C.

Herein, the polyolefin porous polymer film may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film may be obtained by molding various polymers, such as polyesters, other than polyolefins, into a film shape. Further, the porous polymer film may have a stacked structure of two or more film layers, wherein each film layer may be formed of polymers including the above-mentioned polymers, such as polyolefins or polyesters, alone or in combination of two or more of them.

In addition, the porous polymer film substrate and porous nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins.

The porous coating layer may include inorganic particles and a binder polymer. The inorganic particles are bound among themselves by the binder polymer while they are packed and are in contact with each other. Thus, interstitial volumes are formed among the inorganic particles and the interstitial volumes become vacant spaces to form pores.

In addition, the binder polymer assists the binding to the porous substrate and porous polymer film. In the lithium secondary battery according to an embodiment of the present disclosure, a positive electrode, porous polymer film, separator and a negative electrode are stacked successively, wherein the porous polymer film may be bound with the separator by the binder polymer of the porous coating layer.

Herein, non-limiting examples of the binder polymer that may be used for the separator according to the present disclosure may include any one selected from the group consisting of polyvinylidene fluoride, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinylalchol, cyanoethyl cellulose, cyanoethyl sucrose, pullulan and carboxymethyl cellulose, or a mixture of at least two of them.

In addition, the inorganic particles may include inorganic particles having a dielectric constant of 5 or more or inorganic particles capable of transporting lithium ions.

The inorganic having a dielectric constant of 5 or more include any one selected from the group consisting of $BaTiO_3$, $Pb(Zr_x,Ti_{1-x})O_3$(PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_{3-x}PbTiO_3$ (PMNPT, $0<x<1$), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$ and SiC, or a mixture of at least two of them.

The inorganic particles capable of transporting lithium ions include any one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), (LiAlTiP)$_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$) and $P_2S_5$-based glass ($Li_xP_yS_z$, $0<x<3$, $0<y<3$, $0<z<7$), or a mixture of at least two or more of them.

The organic solvent contained in the non-aqueous electrolyte is not particularly limited, as long as it is an organic solvent used conventionally in an electrolyte for a lithium secondary battery. Particular examples of the organic solvent include ethers, esters, amides, linear carbonates, cyclic carbonates, alone or in combination. Typically, a cyclic carbonate, linear carbonate or a combination thereof may be used.

Particular examples of the cyclic carbonate compound include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate and halides thereof, or a combination of two or more of them. For example, the halides thereof may include fluoroethylene carbonate (FEC) but are not limited thereto. Particular examples of the linear carbonate compound include any one selected from the group consisting of dimethyl carbonate (DMC), diethyl carbonate (DEC), dipropyl carbonate, ethyl methyl carbonate (EMC), methyl propyl carbonate and ethyl propyl carbonate, or a combination of two or more of them, but are not limited thereto.

Particularly, among the carbonate-based organic solvents, ethyl carbonate and propylene carbonate which are cyclic carbonates are organic solvents having high viscosity and have a high dielectric constant to facilitate dissociation of a lithium salt in an electrolyte. When using such cyclic carbonates in combination with linear carbonates, such as dimethyl carbonate and diethyl carbonate, having low viscosity and a low dielectric constant at an adequate ratio, it is possible to obtain electrolytes having higher electroconductivity.

In addition, among the organic solvents, the ether compound may include any one selected from the group consisting of dimethyl ether, diethyl ether, dipropyl ether, methyl ethyl ether, methyl propyl ether and ethyl propyl ether, or a combination of two or more of them, but is not limited thereto.

In addition, among the organic solvents, the ester compound may include any one selected from the group consisting of methyl acetate, ethyl acetate, propyl acetate, methyl propionate, ethyl propionate, γ-butyrolactone, γ-valerolactone, γ-caprolactone, σ-valerolactone and ε-caprolactone, or a combination of two or more of them, but is not limited thereto.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLES

Example 1

First, 92 parts by weight of a positive electrode active material ($LiMn_{0.2}Ni_{0.6}Co_{0.2}O_2$), 4 parts by weight of carbon black as a conductive material, and 4 parts by weight of $C_{56}H_{103}N_9O_{39}$-PVdF as a binder polymer were added to N-methyl-2-pyrrolidone (NMP) as a solvent to obtain a positive electrode mixture slurry.

The binder polymer includes $C_{56}H_{103}N_9O_{39}$ bound to the PVdF backbone and contains an amine ($NH_2$) group. The binder polymer used in this example contains about 0.1 parts by weight of $C_{56}H_{103}N_9O_{39}$ based on 100 parts by weight of PVdF backbone. The positive electrode mixture slurry was applied to both surfaces of aluminum (Al) thin film for a positive electrode current collector having a thickness of 20 μm, followed by drying. Then, roll pressing was carried out to obtain a positive electrode.

Comparative Example 1

A lithium secondary battery was obtained in the same manner as Example 1, except that 4 parts by weight of polyvinylidene fluoride (PVDF) was used as a binder polymer of the positive electrode.

Comparison of Dissolution

Each sample (diameter 1 cm) of the electrodes according to Example 1 and Comparative Example 1 was dipped in an electrolyte (60 mL) and was allowed to stand for 2 weeks. During this time, the electrolyte was maintained at a temperature of about 60° C. The electrolyte used herein includes 1M $LiPF_6$ dissolved in a mixed solvent containing ethylene carbonate, dimethyl carbonate and ethyl methyl carbonate at a volume ratio of 3:2:5. After 2 weeks, each electrode sample was removed and content of Ni dissolved into each electrolyte was evaluated. The evaluation results are shown in the following Table 1. As can be seen from the evaluation results, Ni concentration in the electrolyte according to Example 1 is lower as compared to the electrolyte according to Comparative Example 1. This suggests that Ni is adsorbed by the binder in the electrode according to Example 1.

TABLE 1

| Sample | Ni dissolution (ppm) |
| --- | --- |
| Example 1 | 37 |
| Comp. Ex. 1 | 84 |

The present disclosure has been described in detail with reference to particular embodiments and drawings, but it should be understood that the scope of the present disclosure is not limited thereto. It should be also understood that various changes and modifications within the scope of the disclosure will become apparent to those skilled in the art from this detailed description.

DESCRIPTION OF DRAWING NUMERALS

10: Lithium transition metal composite oxide 11: Transition metal ions
20: Binder polymer 21: Binder backbone
22: Functional group capable of adsorbing transition metal ions
30: Positive electrode current collector
100: Positive electrode

What is claimed is:

1. A positive electrode which comprises a lithium transition metal composite oxide and a binder polymer, wherein the binder polymer has a functional group capable of adsorbing the transition metal ions of the lithium transition metal composite oxide,
    wherein the binder polymer is formed by polymerization of single molecules containing the functional group and a binder backbone, and
    wherein the binder backbone comprises at least one selected from the group consisting of polyvinylidene fluoride, polyvinylidene fluoride-co-hexafluoropropylene (PVDF-co-HFP), polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene terpolymer (EPDM), sulfonated EPDM, styrene butadiene rubber (SBR), fluororubber, polyacrylonitrile and polymethyl methacrylate,
    wherein the functional group is chitosan and/or includes chitosan.

2. The positive electrode according to claim 1, wherein the functional group capable of adsorbing the transition metal ions comprises at least one selected from the group consisting of a hydroxyl group, aldehyde group, carboxyl group, nitro group, carbonyl group, ether group, ester group, amine group, formyl group, phenol group, pyridine group and a phosphine group.

3. The positive electrode according to claim 1, wherein the lithium transition metal composite oxide is at least one selected from the group consisting of lithium manganese oxide, lithium cobalt oxide, lithium nickel oxide, lithium nickel manganese oxide and lithium nickel manganese cobalt oxide.

4. The positive electrode according to claim 1, wherein the single molecules comprising the functional group capable of adsorbing the transition metal ions is present in an amount of 0.01-2 parts by weight based on 100 parts by weight of the binder backbone.

5. The positive electrode according to claim 1, which further comprises a positive electrode current collector coated with the lithium transition metal composite oxide and the binder polymer.

6. The positive electrode according to claim 5, wherein the positive electrode current collector comprises at least one selected from the group consisting of stainless steel, aluminum, nickel, titanium and baked carbon.

7. A lithium secondary battery comprising a negative electrode, the positive electrode as defined in claim 1, a separator interposed between the negative electrode and the positive electrode, and a non-aqueous electrolyte.

* * * * *